United States Patent
Moraitis et al.

(10) Patent No.: US 11,727,250 B2
(45) Date of Patent: Aug. 15, 2023

(54) ELASTIC-CENTROID BASED CLUSTERING

(71) Applicant: INTERNATIONAL BUSINESS MACHINES CORPORATION, Armonk, NY (US)

(72) Inventors: Timoleon Moraitis, Glattpark (CH); Abu Sebastian, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 497 days.

(21) Appl. No.: 16/563,811

(22) Filed: Sep. 6, 2019

(65) Prior Publication Data

US 2021/0073616 A1 Mar. 11, 2021

(51) Int. Cl.
| | |
|---|---|
| G06F 17/00 | (2019.01) |
| G06N 3/049 | (2023.01) |
| G06N 3/063 | (2023.01) |
| G06N 3/08 | (2023.01) |
| G06F 16/28 | (2019.01) |

(52) U.S. Cl.
CPC .......... *G06N 3/049* (2013.01); *G06F 16/285* (2019.01); *G06N 3/063* (2013.01); *G06N 3/08* (2013.01)

(58) Field of Classification Search
CPC .......... G06N 3/049; G06N 3/063; G06N 3/08; G06F 16/285
See application file for complete search history.

(56) References Cited

U.S. PATENT DOCUMENTS

| | | | |
|---|---|---|---|
| 6,480,615 B1 * | 11/2002 | Sun | G06T 7/248 382/103 |
| 7,142,600 B1 | 11/2006 | Schonfeld et al. | |
| 7,433,497 B2 * | 10/2008 | Chen | H04N 5/23248 348/E5.066 |

(Continued)

FOREIGN PATENT DOCUMENTS

CN 108985318 A 12/2018

OTHER PUBLICATIONS

Garg, D. et al., "Fuzzy K-Mean Clustering in MapReduce on Cloud Based Hadoop"; IEEE International Conference on Advanced Communication Control Computing Technologies (2014); pp. 1607-1610.

(Continued)

*Primary Examiner* — Greta L Robinson
(74) *Attorney, Agent, or Firm* — Intelletek Law Group, PLLC; Gabriel Daniel, Esq.

(57) ABSTRACT

A computer device, a non-transitory computer storage medium, and a computer-implemented method of pattern recognition utilizing an elastic clustering algorithm. A sequence of input datapoints are assigned to a particular cluster of K clusters based on a distance from a centroid k representing a center of the particular cluster. The centroid k in each of the K clusters is shifted from a first position to a second position closer than the first position from the sequence of input datapoints. A location of the centroid k in each of the K clusters is relaxed from the second position toward an equilibrium point in the particular cluster of the K clusters. The relaxing of the location of the centroid k occurs according to an elasticity pull factor based on a distance between the centroid k of the particular cluster at a time t.

20 Claims, 14 Drawing Sheets

(56) References Cited

U.S. PATENT DOCUMENTS

| | | | |
|---|---|---|---|
| 8,606,732 B2 | 12/2013 | Subramaniam et al. | |
| 8,837,839 B1 | 9/2014 | Huber et al. | |
| 9,129,221 B2 | 9/2015 | Piekniewski et al. | |
| 9,147,155 B2 | 9/2015 | Chan et al. | |
| 9,727,633 B1 | 8/2017 | Dykstra et al. | |
| 10,162,794 B1* | 12/2018 | Arel | G06N 3/0445 |
| 10,311,312 B2* | 6/2019 | Yu | G06K 9/6259 |
| 10,325,223 B1* | 6/2019 | Arel | G06N 3/0445 |
| 2007/0133840 A1 | 6/2007 | Cilia | |
| 2014/0143251 A1* | 5/2014 | Wang | G06F 16/285 |
| | | | 707/737 |
| 2014/0258194 A1* | 9/2014 | Towal | G06N 3/10 |
| | | | 706/26 |
| 2015/0088797 A1* | 3/2015 | Kim | G06N 3/049 |
| | | | 706/29 |
| 2015/0220831 A1* | 8/2015 | Hunzinger | G06N 3/08 |
| | | | 706/25 |
| 2018/0330228 A1 | 11/2018 | Koelmans et al. | |
| 2018/0349605 A1 | 12/2018 | Wiebe et al. | |
| 2019/0197410 A1* | 6/2019 | Berry, II | G06N 3/088 |

OTHER PUBLICATIONS

International Search Report and Written Opinion issued in related application No. PCT/IB2020/057928 dated Dec. 9, 2020, 6 pgs.

Mell, P. et al., "Recommendations of the National Institute of Standards and Technology"; NIST Special Publication 800-145 (2011); 7 pgs.

\* cited by examiner

100B

IMAGES OF OBJECT

| OBJECT A<br>(FRONT VIEW)<br>150-1 | OBJECT A<br>(ROTATED VIEW – 45°)<br>150-2 | OBJECT A<br>(ROTATED VIEW – 90°)<br>150-3 |

TRAINING SET

| OBJECT A<br>(FRONT VIEW)<br>155-1 | OBJECT A<br>(ROTATED VIEW – 45°)<br>155-2 | OBJECT A<br>(ROTATED VIEW – 90°)<br>155-3 |

TESTING SET 1

| OBJECT A<br>(FRONT VIEW)<br>160-1 | OBJECT A<br>(ROTATED VIEW – 45°)<br>160-2 | OBJECT A<br>(ROTATED VIEW – 90°)<br>160-3 | PASS |

TESTING SET 2

| OBJECT A<br>(FRONT VIEW)<br>165-1 | OBJECT A<br>(ROTATED VIEW – 45°)<br>165-2 | OBJECT A<br>(ROTATED VIEW – 90°)<br>165-3 | OBJECT A<br>(ROTATED VIEW – 135°)<br>165-4 X | FAIL |

FIG. 1B

Clustering Implementation

- Input of N spatial dimensions $X(t)=\{X_i(t)..X_n(t)\}$, normalized between 0 and 1.
- K cluster centroids $C_i=\{G_i(t)..G_n(t)\}$, $G_i=W_i+F_i$
- K equilibrium points $Q_i=\{W_i(t)..W_n(t)\}$, found e.g. by k-means
- Clustering of spatiotemporal input $X(0...t)$ into centroids $C_i$

- Elasticity: relax towards equilibrium by dF
- Assign cluster: calculate proximity P0 of spatiotemporal input $X(0,...,t)$ to centroid traces $C_i(0,...,t)$.
- Cluster-assignment proximity P0(X,C) can be any metric function:
  - Euclidean distance
  - Activation function of (Integrated input + leak). Optionally also integrate recurrent input from self/other centroids.
- Update cluster(s): Move $C_i$ by an update proximity metric P1. P1 may be the same as P0, or it may be a different one, e.g. P1=f(P0)
  - P1 may be P0 scaled by a measure of intensity of the input (STDP curve part of ST-STDP)

FIG. 3A

Neural Implementation

300B

Input of N spatial dimensions $X_i(t)=\{x_i(t)..x_n(t)\}$, normalized between 0 and 1.
- K neurons. $G_i$ are synaptic efficacies. F is short-term component
- $W_i$ are synaptic weights, learned e.g. by STDP/backprop
- Pattern recognition of spatiotemporal input

- Short-term plasticity, $dF/dt$, e.g. Exponential
- Activate neurons: calculate proximity $P_0$ of spatiotemporal input $X_i(0,...,t)$ to centroid traces $C_i(0,...,t)$.
- Cluster-assignment proximity $P_0(X,C)$ can be any metric function:
  Euclidean distance
  $P_0$ = ReLu/Step/Spiking activation function of (integrated input+leak, optionally including recurrent connections).

Update synaptic efficacies: Move $C_i$ by $P_0$ scaled by an integrated representation of the input (e.g. Convolution with exponential temporal Kernel)

FIG. 3B

| CNN/MLP/RNN | | ST-STDP SNN | |
|---|---|---|---|
| Supervised | ✗ | Unsupervised | ✓ |
| 20k epochs | ✗ | 1 epoch, real-time learning | ✓ |
| Trained w/ occluded video | ✗ | Trained w/ static images | ✓ |
| Artificial | ✗ | Biologically plausible | ✓ |
| Clock-based operation | ✗ | Event-based operation | ✓ |

FIG. 5

ELASTIC-CENTROID BASED CLUSTERING

BACKGROUND

Technical Field

The present disclosure generally relates to cognitive computing, and more particularly, to utilizing machine learning to recognize objects/data from partial patterns.

Description of the Related Art

In machine learning, K-means clustering is an unsupervised algorithm utilized for recognition of static patterns by identifying a number (k) of clusters in a dataset. A cluster represents an aggregation of points because of certain common attributes. A centroid is a real or an imaginary location representing the center of the cluster. In the case of dynamic patterns, the accuracy of pattern recognition declines over a continuity of time, where the objects have morphed or become at least partly occluded through various types of motion, such as rotation, linear, rectilinear and non-linear motion, or the motion of other objects in a viewing path, or through similar transformations in input pattern domains other than vision, such as auditory data (sound), financial data, biological signals, medical data sequences, etc.

SUMMARY

According to various embodiments, a computing device, a non-transitory computer readable storage medium and a computer-implemented method of performing pattern recognition utilizing elastic clustering.

In one embodiment, a computer-implemented method of pattern recognition using an elastic clustering algorithm includes assigning input datapoints of a sequence of datapoints representing a group of data to a particular cluster of K clusters based on a distance from a centroid k representing a center of the particular cluster. A clustering the datapoints is performed based on their location relative to the centroid k. The centroid k is shifted from a first position to a second position determined to be closer than the first position from the sequence of input datapoints assigned to the particular cluster at a particular time. A location of the centroid k is relaxed from the second position toward an equilibrium point in the particular cluster of the K clusters. The relaxing of the location of the centroid k from the second position toward the equilibrium point in the particular cluster of the K clusters occurs according to an elasticity pull factor.

In one embodiment, the elasticity pull factor comprises dF/dt, in which F is a distance-dependent short-term component from the centroid k of the particular cluster during a time t.

In one embodiment, a machine learning model is created to analyze a training set including sequences of data grouped over a time continuum, label, by a subject matter expert (SME) each of the sequences. The sequences of data include dynamic images.

In one embodiment, a computing device includes a processor, a storage device coupled to the processor, and a pattern recognition module using an elastic clustering algorithm stored in the storage device, wherein an execution of the pattern recognition module configures the computing system to assign one or more input datapoints of a sequence of datapoints representing a group of data to a particular cluster of K clusters based on a distance from a centroid k representing a center of the particular cluster; cluster the datapoints based on their location relative to the centroid k shift the centroid k from a first position to a second position determined to be closer than the first position from the sequence of input datapoints assigned to the particular cluster of the K clusters over a predetermined time period; and relax a location of the centroid k from the second position toward an equilibrium point in the particular cluster of the K clusters. The location of the centroid k relaxes from the second position toward the equilibrium point in the particular cluster of the K clusters occurs according to an elasticity pull factor based on a distance between the centroid k of the particular cluster at a time t.

In one embodiment, the computing device includes a circuit having an input node and an output node. At least one pre-synaptic neuron is coupled to the input node, and at least one post-synaptic neuron is coupled to the output node. A first synapse configured for controlling a short-term component F(t) in conjunction with a learning function of a short-term spike-timing-dependent plasticity (ST-STDP) module, and a second synapse is configured for controlling a weight W(t) in conjunction with a learning function of a long-term standard plasticity STDP module. An adder is configured to receive the weight W(t) and the short-term component F(t) and output efficacies to the post-synaptic neuron.

In one embodiment, a non-transitory computer readable storage medium tangibly embodying a computer readable program code having computer readable instructions that, when executed, causes a computer device to carry out a method of performing pattern recognition using an elastic clustering algorithm. One or more of sequences of input datapoints of a sequence of datapoints representing an image are assigned to a particular cluster of K clusters based on a distance from a centroid k representing a center of the particular cluster. The centroid k is shifted from a first position to a second position determined to be closer than the first position from the sequence of input datapoints assigned to the particular cluster of the K clusters over a predetermined time period. The location of the centroid k is relaxed from the second position toward an equilibrium point in the particular cluster of the K clusters.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 1B illustrates an output of a pattern recognition testing set of multiple views based on time continuity.

FIG. 3A is a list of operations in a clustering implementation, consistent with an illustrative embodiment.

FIG. 3B is a list of operations for a neural implementation, consistent with an illustrative embodiment.

FIG. 5 shows a comparison of the use of an elastic clustering algorithm with a Spiking Neural Network (SNN) versus a convolutional neural network, multilayer neural network, or recurrent neural network, consistent with an illustrative embodiment.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In machine learning systems, the introduction of images that are multiple views of objects may be part of a training process to increase the speed and accuracy of pattern recognition. However, the machine learning system may apply inferences to identify a pattern, for example, when a position or construction of an object does not match, or partially matches, one of the training samples. In such a case, an exhaustive training and training set is used, in which each facet of the same pattern is treated as a separate pattern. Each facet may be recognized independently. However, without exhaustive training, it can be unclear, for example, as to whether two or more facets that have been identified are from the same object, or from different objects.

It is to be understood that a Spiking Neural Networks (SNNs) are configured to emulate in silico a central nervous system. In SNN spiking neurons often communicate by utilizing voltage spikes that carry information in their timing. Synapses, which are connections between neurons that include Spike Timing Dependent Plasticity (STDP) and Short-Term Plasticity (STP) that changes the synaptic efficiency dynamically depending on a timing of pre-synaptic and post-synaptic voltage spikes.

With regard to STDP and (STP), it is to be understood that in STDP, there are changes in synaptic strength, based on the timing difference between presynaptic and postsynaptic spikes. On the other hand, STP can be characterized by transient, temporary changes in synaptic strength. Moreover ST-STDP has synaptic changes like in STDP, but with transient effects.

Accordingly, in one embodiment, what is provided herein are methods and systems that use machine learning to conserve time and valuable network and computational resources. Reference now is made in detail to the examples illustrated in the accompanying drawings and discussed below.

Example Architecture

Figure 1A:
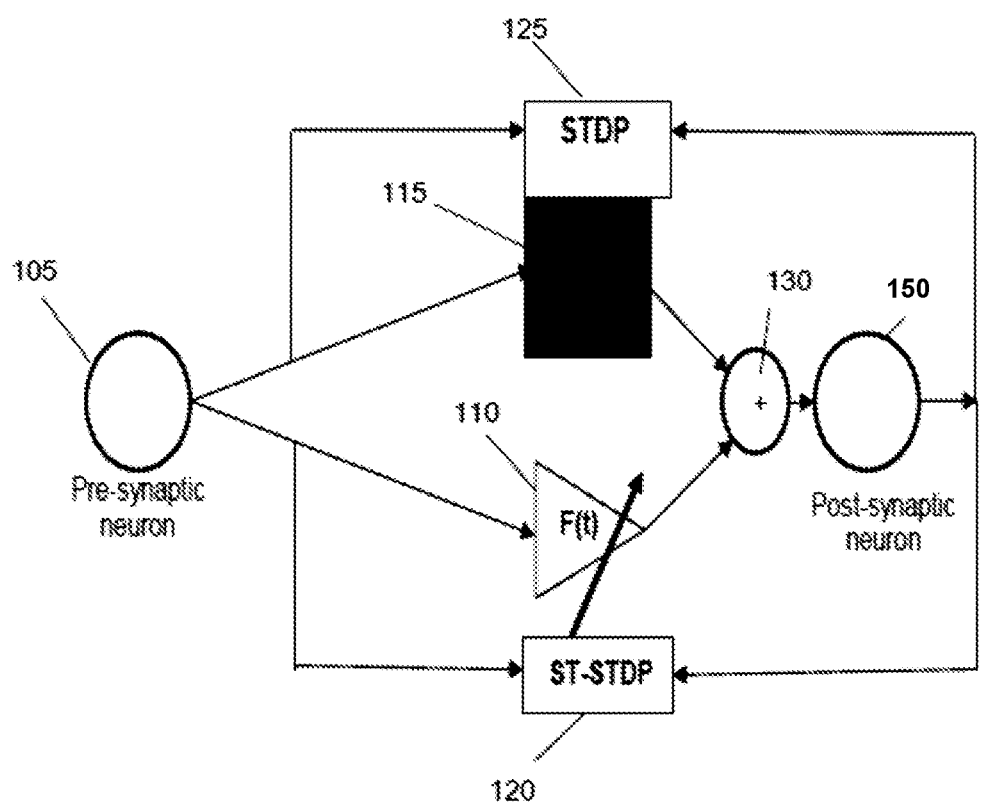
FIG. 1A illustrates an example architecture of a block diagram of a circuit configured to implement pattern recognition in an elastic clustering algorithm in a spiking neural network, consistent with an illustrative embodiment.

FIG. 1A illustrates a block diagram of an example architecture to implement pattern recognition in an elastic clustering algorithm in a spiking neural network, consistent with an illustrative embodiment. Both a long-term STDP and a short-term STDP (ST-STDP) are utilized. With reference to FIG. 1A, the network 100A includes at least one pre-synaptic neuron 105 and one post-synaptic neuron 150. A first synapse 110 is configured for controlling the short-term component F(t) in conjunction with the learning of the short-term spike-timing-dependent plasticity (ST-STDP) 120, and the second synapse 115 is configured for controlling the weight W(t) in conjunction with the learning of the long-term standard plasticity STDP 125. Together, the adding of the weight W(t) and the F(t) at adder 130 constitutes the efficacies output to the post-synaptic neuron 150. In this embodiment, the (ST-STDP) 120 is unsupervised and may be trained with static images and video including occluded images. The number of epochs used to train a machine learning module as shown in FIG. 1A can be a few as 1, resulting in a significant reduction in epochs versus training in a conventional machine learning environment. The reduction in epochs is particularly significant in the case of training for the recognition of occluded images.

In unsupervised learning, historic data can be provided without labels as to what is an acceptable classification. Such algorithms can operate by building a model from stored prior inputs or baselines therefrom in order to make data-driven predictions or decisions (or to provide threshold conditions) to indicate whether a communication thread belongs to a predetermined cluster, rather than following strictly static criteria. Based on the machine learning, there can be patterns and trends that are identified, and any outliers identified as not belonging to the cluster.

In various embodiments, the machine learning may make use of techniques including supervised learning, unsupervised learning, semi-supervised learning, naïve Bayes, Bayesian networks, decision trees, neural networks, fuzzy logic models, and/or probabilistic classification models.

FIG. 1B shows an output of a pattern recognition testing set based on time continuity. A sequence of views 150-1, 150-2, and 150-3 of object A. In a conventional training set, all of the views would have to be provided during a training phase. For example, in the training set shown, the mages 155-1, 155-2 and 155-3 are provided during a training phase. Testing set 1 shows that the image recognition passes, as 160-1, 160-2 and 160-3 are all part of the training set. However, as shown in testing set 2. The test fails because while 165-1, 165-2 and 165-3 are recognized, an image of object A rotated by 135 degrees was not previously learned. According to aspects of the present disclosure, through the use of time continuity, for example, all of the sequence of views in testing set two can be recognized based on an inference from the training set 1.

Figure 2:
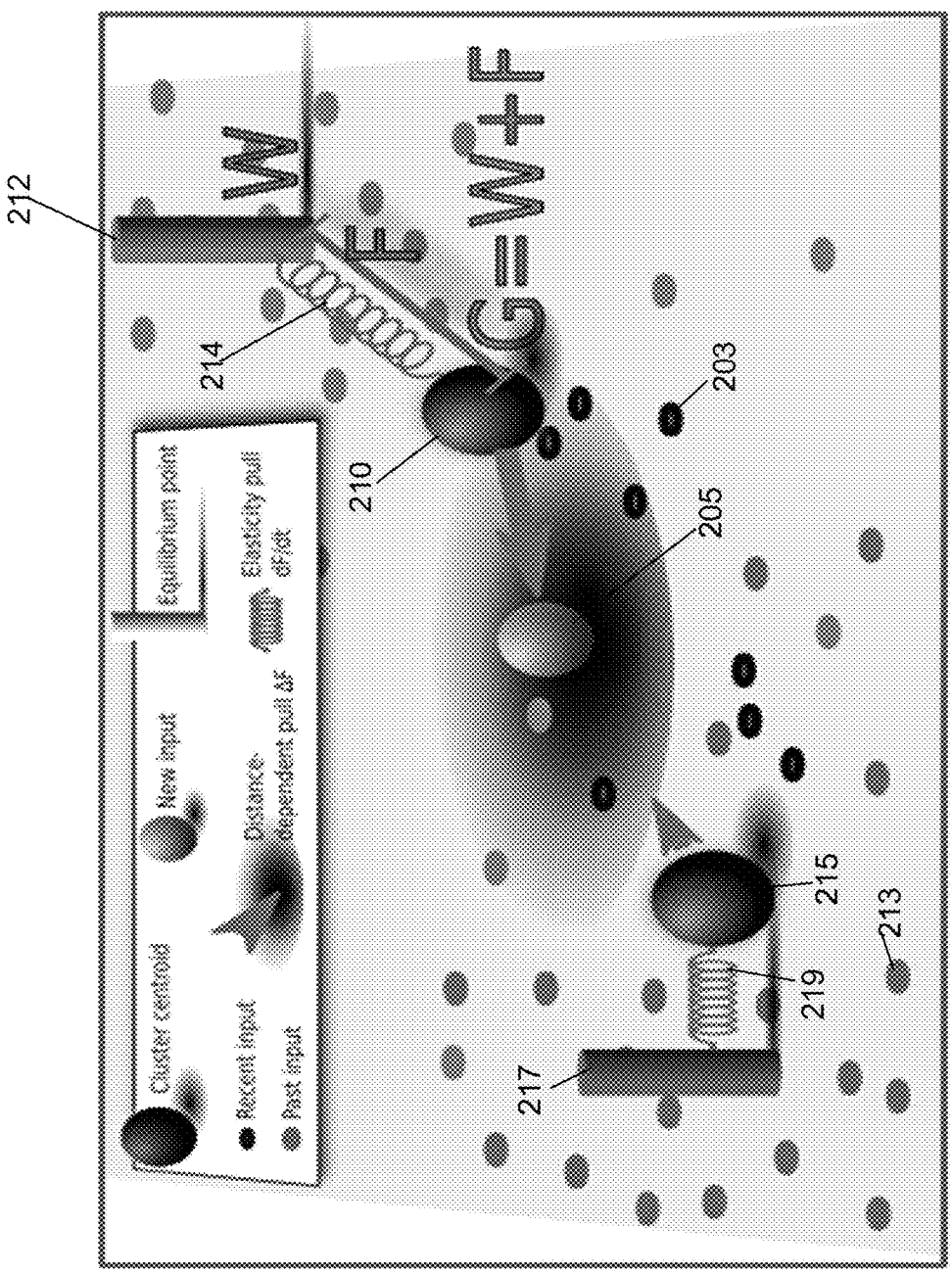
FIG. 2 is an illustration schematic of inputs being clustered on a single time step, consistent with an illustrative embodiment.

FIG. 2 is an illustrative example 200 of inputs being clustered on a single time step, consistent with an illustrative embodiment. As shown in FIG. 2, a new input 205 is shown in proximity to a first cluster centroid 210 having an equilibrium point 212 and a second cluster centroid 215 having an equilibrium point 217. The new input 205 attracts the cluster centroids 210, 215 toward it. The springs 214, 219 represent an elasticity of the respective first cluster centroid 210 and the second cluster centroid 215, both toward the new input 205, with a relaxation back toward a respective equilibrium point 212, 217. As shown in FIG. 2, the distance dependent pull dF (F being a short-term component shown by the arrows), and the elasticity pull may be calculated by dF/dt. Also, the position of the first cluster centroid 210, represented by G in FIG. 2, can be calculated as G=W+F, with W being the weight and F being the short-term component. The elasticity pull may depend on the displacement of the centroid from its equilibrium point, for example, in an exponential way: dF/dt=−F/τ, in which case the kernel f(t) can be an exponential decay kernel, with a time constant τ.

With regard to FIG. 2, it is to be understood that an input can be realized as a group of data. The data may be of various types, including but in no way limited to, for image data, audio data, medical data, financial data. The data may be dynamic data, such as moving images. Data of the aforementioned non-limiting examples may be partially occluded, or may constitute, for example, in the case of image data, a front view or a side view.

FIG. 3A is a list of operations 300A in a clustering implementation, consistent with an illustrative embodiment. In this example, the initial elastic clustering algorithm is used in a clustering operation. The first four bullet points are provided to set up the operations of the clustering implementation. For example, an input of N spatial dimensions is X(t)={Xi(t) . . . Xn(t)}, normalized between 0 and 1. The K cluster centroids are Ci={Gi(t) . . . Gn(t)}, Gi=Wi+Fi, and the K equilibrium points are Qi={Wi(t) . . . Wn(t)} (e.g., found by k-means). There is a clustering of spatiotemporal input X(0 . . . t) into the centroids Ci.

With continued reference to FIG. 3A, the algorithm includes performing an elasticity function to relax a position of the centroid towards equilibrium by dF. The algorithm further includes assigning a cluster by calculating a proximity P0 of spatiotemporal input X(0, . . . , t) to centroid traces Ci(0, . . . , t). The cluster assignment proximity P0(X, C) can be any metric function, for example, a Euclidean distance, or an activation function of (Integrated input+leak). Optionally, there can be an integration recurrent input from self/other centroids.

The algorithm further includes updating cluster(s) by moving Ci by an update proximity metric P1, which may be the same as P0, or it may be a different one, e.g. P1=f(P0). In addition, P1 may be P0 scaled by a measure of the intensity of the input (e.g., an STDP curve part of ST-STDP).

FIG. 3B is a list of operations 300B for a neural implementation, consistent with an illustrative embodiment. In this example embodiment, the elastic clustering algorithm is used in a neural network implementation. The first three bullet points are provided to set up the neural implementation. For example, an input of N spatial dimensions Xi(t)= {Xi(t) . . . Xn(t)}, normalized between 0 and 1. There are K neurons, with synaptic efficacies Gi, and F is a short-term component, Wi are synaptic weights, learned e.g., by STDP/backprop, and a pattern recognition of spatiotemporal input.

With continued reference to FIG. 3B, the algorithm includes determining short-term plasticity, dF/dt, (e.g., Exponential). The algorithm of FIG. 3B also includes activating neurons by calculating proximity P0 of spatiotemporal input Xi(0, . . . , t) to centroid traces Ci(0, . . . , t). The cluster-assignment proximity P0(X,C) can be any metric function, e.g., Euclidean distance, P0=ReLu/Step/Spiking activation function of (integrated input+leak, optionally including recurrent connections). The algorithm of FIG. 3B further includes updating synaptic efficacies by moving Ci by P0 scaled by an integrated representation of the input (e.g., Convolution with exponential temporal Kernel).

Figure 4:
FIG. 4 is an illustration of equations that are a basis for the implementation of an elastic clustering algorithm, consistent with an illustrative embodiment.

FIG. 4 is an illustration of equations 400 that are a basis for implementation of the elastic clustering algorithm, consistent with an illustrative embodiment. In FIG. 4 there is shown Equations (1) through (5). The mathematical basis for the state V(X1, t) that a neuron takes due to an input $X_1$ at time t. V(X1,∞) is the state that the neuron would take if it received the same input X1, at a time point infinitely far from any previous inputs. The state V may be the membrane potential of a spiking neuron. This state determines the activation O(V) of the neuron, which may be for example an output spike in the case of spiking neurons, or an analog value otherwise. Equation (1), therefore, describes a possible implementation whereby the state of the neuron is the state V(X1,∞) that the neuron would take in the absence of elastic clustering or ST-STDP, but changed by a component that depends on the recent output O(t-dt), the recent input X0(t-dt) and the present input X1. Equation (3) is more general, in that the dependence is not only on the most recent input, but on all past inputs, each weighted according to a temporal kernel v(τ). Equations (4) and (5) are a way of describing the elastic clustering algorithm. Equation (5) is derived by further generalizing Equation (3) to also extend the dependence on further past outputs O, as opposed to only the most recent one O(t-dt). The state of the neuron is given by the weight W and the short term component F multiplied by the input. In equation (5), O represents the output of the neuron at t-tau, X is the input at t-tau, and temporal kernels v and f. The illustration of FIG. 4 can be used to understand the dependence on the input X and the activation of the neuron, including, for example, the analog to the proximity metric previously discussed herein. With regard to the dynamics of the dependence of time, there are two dependencies shown in FIG. 4, v(τ) and f(τ), where the f(τ) is the relaxation dynamics, and v(τ) is the dependence on time regarding attraction of recent inputs versus past inputs. Thus, inputs can be clustered and sequenced. It will be understood that the equations show in FIG. 4 are provided for illustrative purposes and the inventive concepts of the present disclosure are not limited to the examples shown and described.

FIG. 5 shows a comparison 500 of the use of an elastic clustering algorithm having a Spiking Neural Network (SNN), versus a convolutional neural network (CNN), multilayer neural network (MLN), or recurrent neural network (RNN), consistent with an illustrative embodiment. As illustrated in FIG. 5, while the CNN/MLP/RNN is supervised during training, and in this example had approximately 20,000 epochs to train for the recognition of occluded images, the ST-STDP (SNN) is unsupervised during training, and a single epoch in real time was used during its training. While the CNN/MLP/RNN was trained with static images and occluded video, the ST-STDP (SNN) was trained just with static images.

Finally, while the CNN/MLP/RNN was implemented as an artificial neural network with clock-based operation, the ST-STDP (SNN) functions closer to how an actual neural system would operate in an event-based operation. It has been acknowledged by those of skill in the art that an actual biological neural system is superior to machine-based forms of recognition, particularly those utilizing inference, and the ST-STDP (SNN) is closer to such types of pattern recognition than CNN/MLP/RNN.

Figure 6:
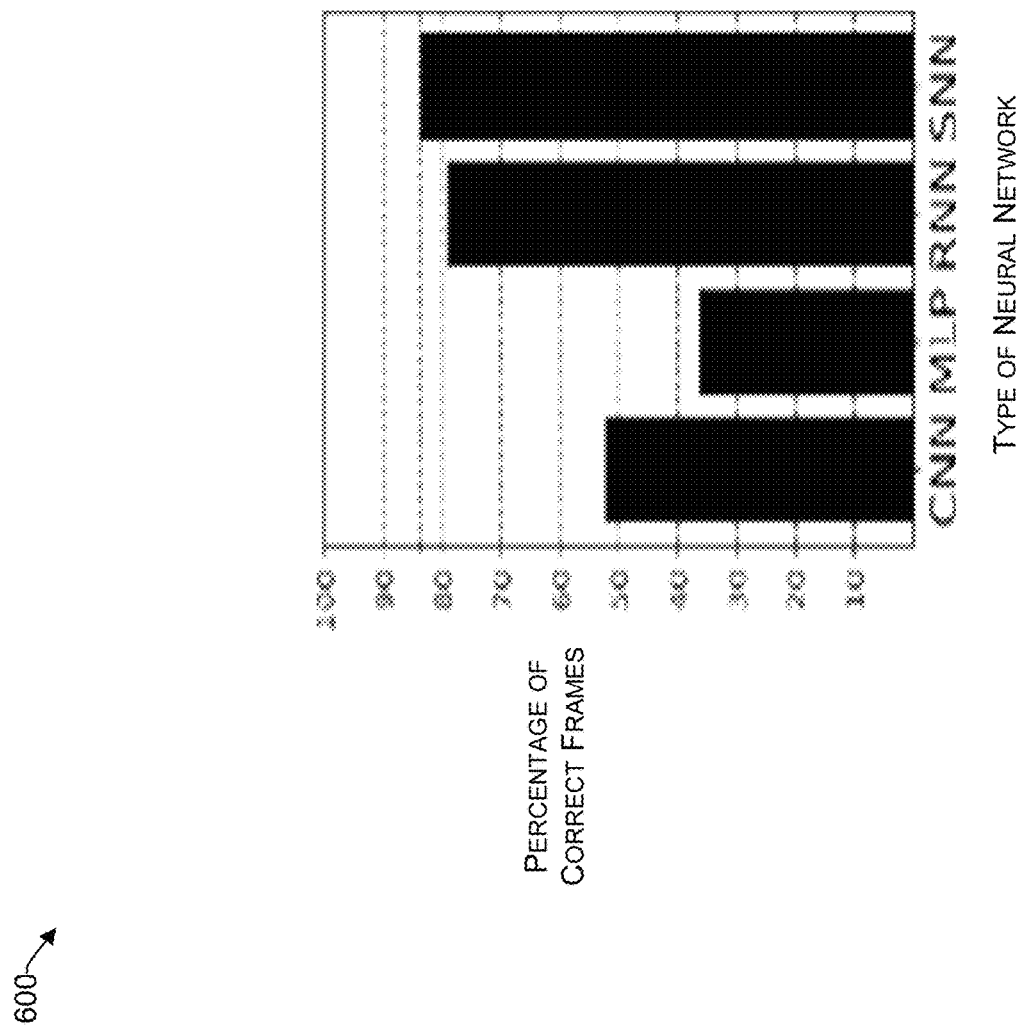
FIG. 6 is a graph showing a percentage of correct frames for convolutional neural network (CNN), multilayer perceptron (MLP), recurrent neural network (RNN), and spiking neural network (SNN), consistent with an illustrative embodiment.

FIG. 6 shows a graph 600 of a percentage of correct frames for CNN, MLP, RNN, and SNN, consistent with an illustrative embodiment. Referring to the discussion regarding FIG. 5 herein above, it can be seen in FIG. 6 that the SNN has a superior result with regard to the percentage of correct frames when compared with CNN/MLP/RNN.

Figure 7:
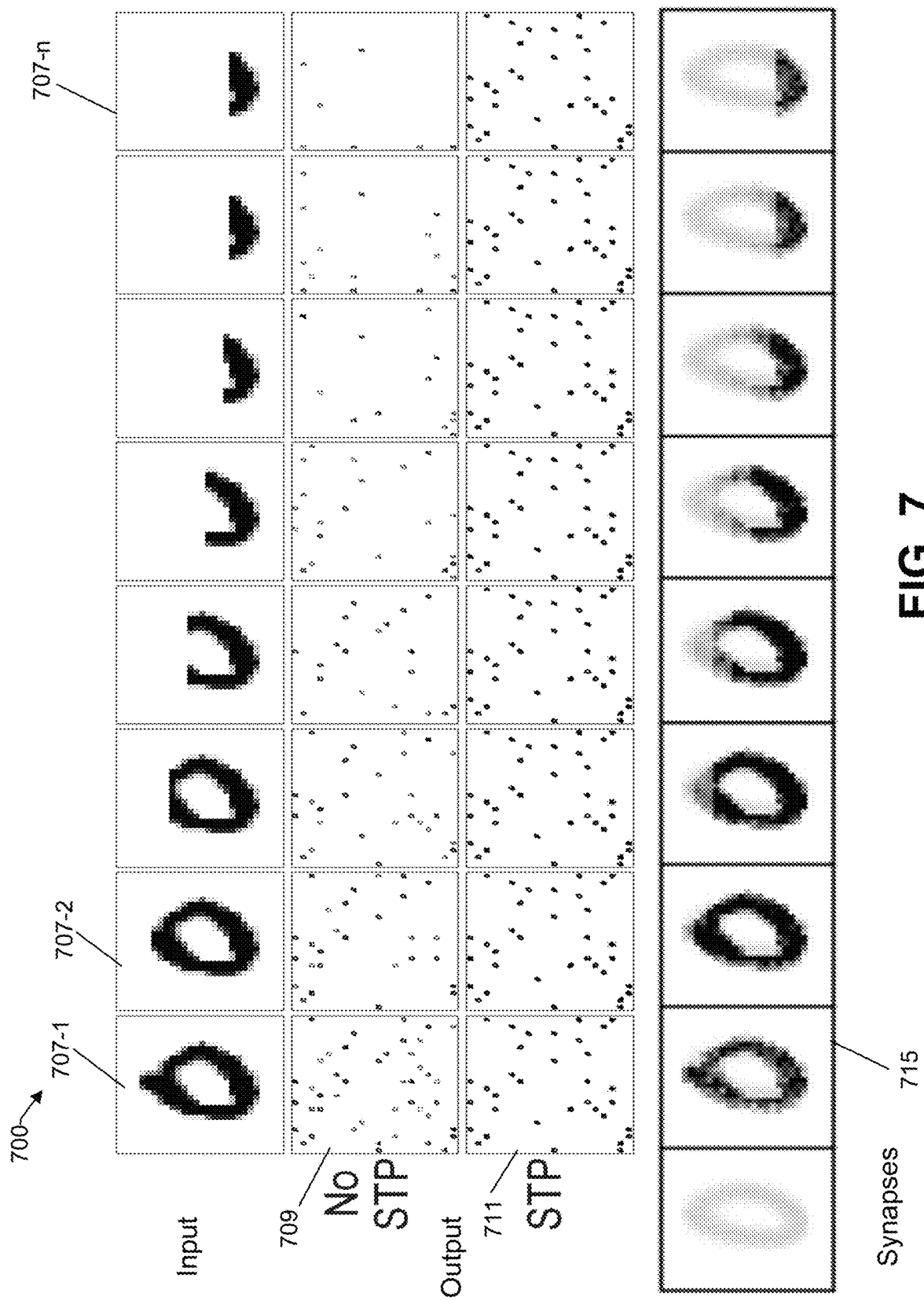
FIG. 7 shows an effect of short-term plasticity (STP) on occlusion robustness in the recognizing of partial patterns, consistent with an illustrative embodiment.

FIG. 7 shows an effect of short-term plasticity (STP) on occlusion robustness in the recognizing of partial patterns 700, consistent with an illustrative embodiment. The input begins with a row of increasing occluded portions of the first image 707-1 to 707-$n$. Without STP 709, as the occlusion increases from 707-1 to 707-$n$, there is a decreased recognition of the image, as shown by the decreased output in the "STP" underneath 707-$n$. However, as shown in the row with STP 711 line of output, there is still a fairly robust quantity of outputs recognizing the increasing occluded image. The synapses 715 are shown on the bottom row.

Figure 8:
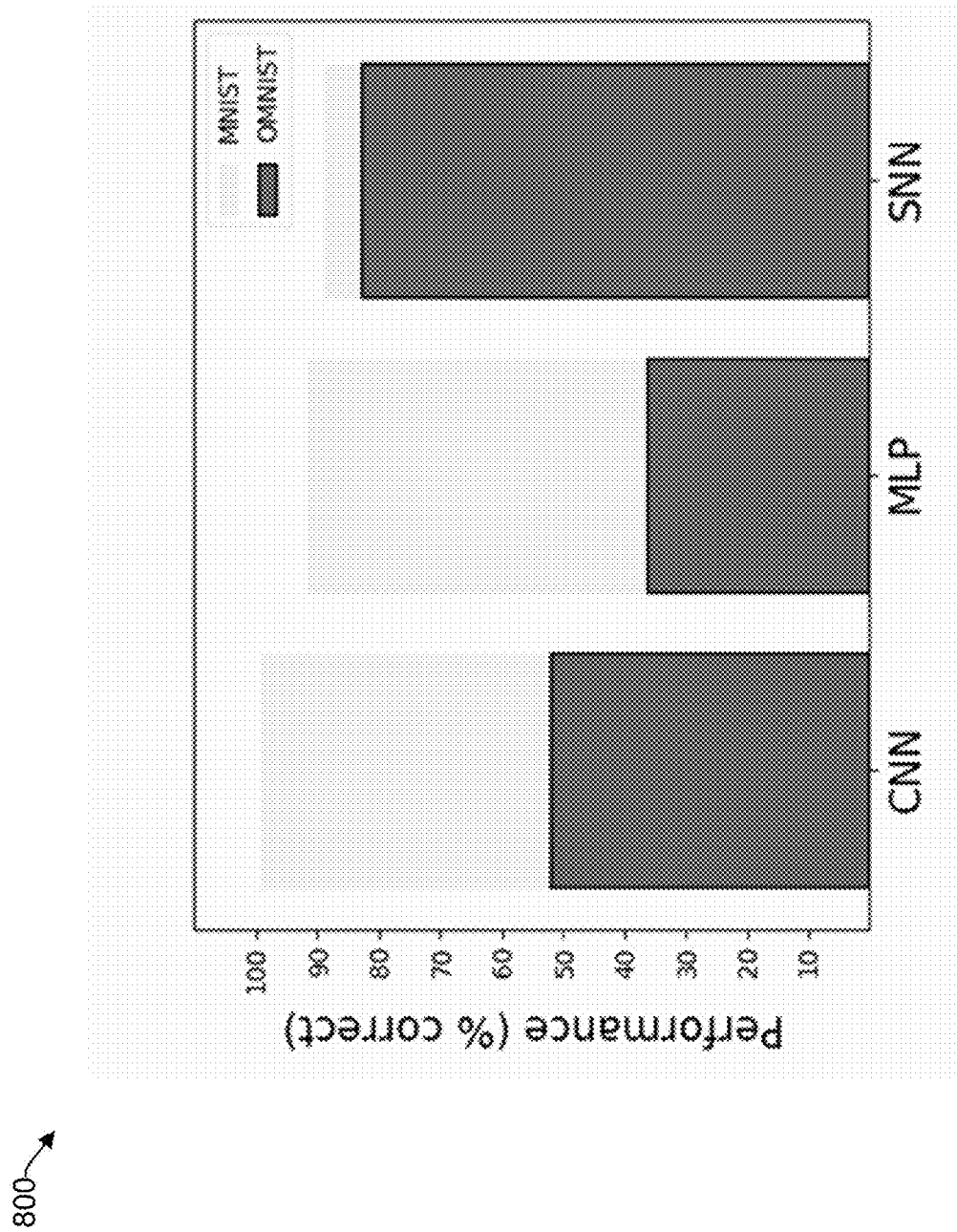
FIG. 8 is a graphical representation of a performance of correctly identified percentage of handwritten digits for CNN, MLP and SNN networks of a Modified National Institute of Standards and Technology (MNIST) database of handwritten digits and an Occluded MNIST (OMNIST) database of handwritten digits, consistent with an illustrative embodiment.

FIG. 8 is a graphical representation 800 of a performance of correctly identified percentage of handwritten digits for CNN, MLP, and SNN networks of a Modified National Institute of Standards and Technology (MNIST) database of handwritten digits and an Occluded MNIST (OMNIST) database of handwritten digits, consistent with an illustrative embodiment. As is shown in FIG. 8, the SNN network has superior performance in the occluded recognition of the handwritten characters (OMNIST), with the percentage correct close to the 90% range, which is a significant increase over the use of CNN and MLP.

By virtue of the concepts discussed herein, various aspects of the present disclosure provide for an improvement in computer operation and in another technology (e.g., the recognition of objects/data that may be partially occluded or having a morphed or changed view point from samples. The improvement in computer operation includes a large reduction or elimination of the utilization of resources associated with performing multiple epochs that can number into the thousands to provide the multitude of views of an object in motion that would be provided in a conventional training phase for subsequent recognition. Thus, the various aspects, as discussed herein, improve computer operation by reducing the utilization of resources associated with domain-specific searching. Reduced CPU cycles, reduced memory usage, and less network utilization are provided.

Example Process

Figure 9:
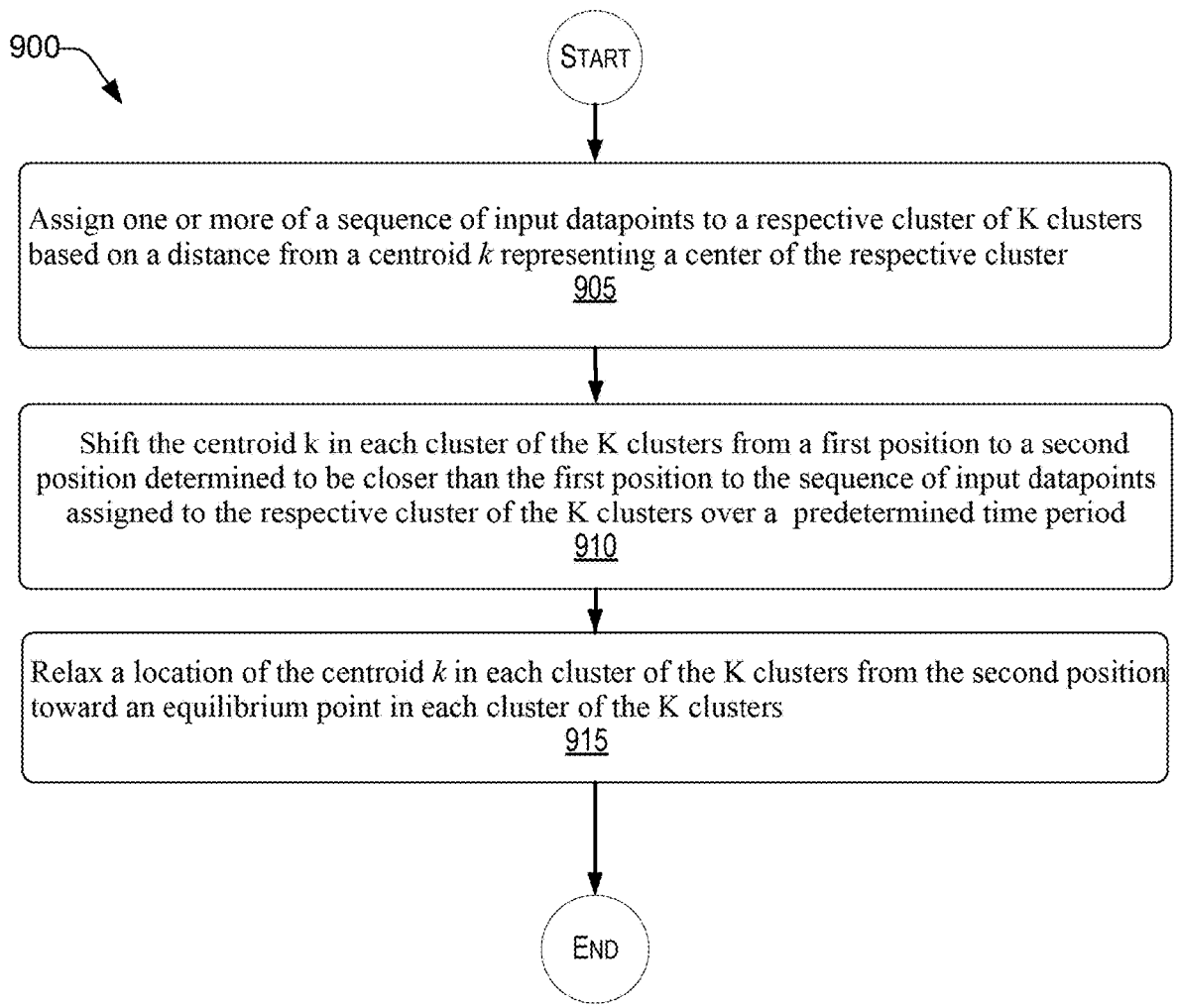
FIG. 9 is a flowchart consistent with an illustrative embodiment.

With the foregoing overview of the example architecture of FIG. 1A it may be helpful now to consider a high-level discussion of an example process. To that end, FIG. 9 presents an illustrative process related to recognizing patterns consistent with an illustrative embodiment. Process 900 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At 905, a processor of a computing device configured to perform pattern recognition using an elastic clustering algorithm assigns one or more of a sequence of input datapoints to a respective cluster of K clusters based on a distance from a centroid k representing a center of the respective cluster. The sequences of inputs may be images or other types of data. For example, a series of images over time of a cat, includes dynamic motion.

At 910, the centroid k is shifted in each respective cluster of the K clusters from a first position to a second position that is determined to be closer than the first position from the sequence of input datapoints assigned to each respective cluster of the K clusters over a predetermined time period.

At 915, the location of the centroid k in each respective cluster of the K clusters is relaxed from the second position toward an equilibrium point in the respective cluster of the K clusters. With regard to operation 915, the location of the centroid k is relaxed from the second position toward the equilibrium point in each cluster of the K clusters occurs according to an elasticity pull dF/dt, wherein F is a distance-dependent short-term component from the centroid k of the particular cluster during a time t.

Example Computer Platform

As discussed above, functions relating to adjusting the content of electronic communication based on the expected recipients can be performed with the use of one or more computing devices connected for data communication via wireless or wired communication, as shown in FIGS. 1A and 1$n$ accordance with the process 900 of FIG. 9, and the implementations in FIGS. 3A and 3B.

Figure 10:
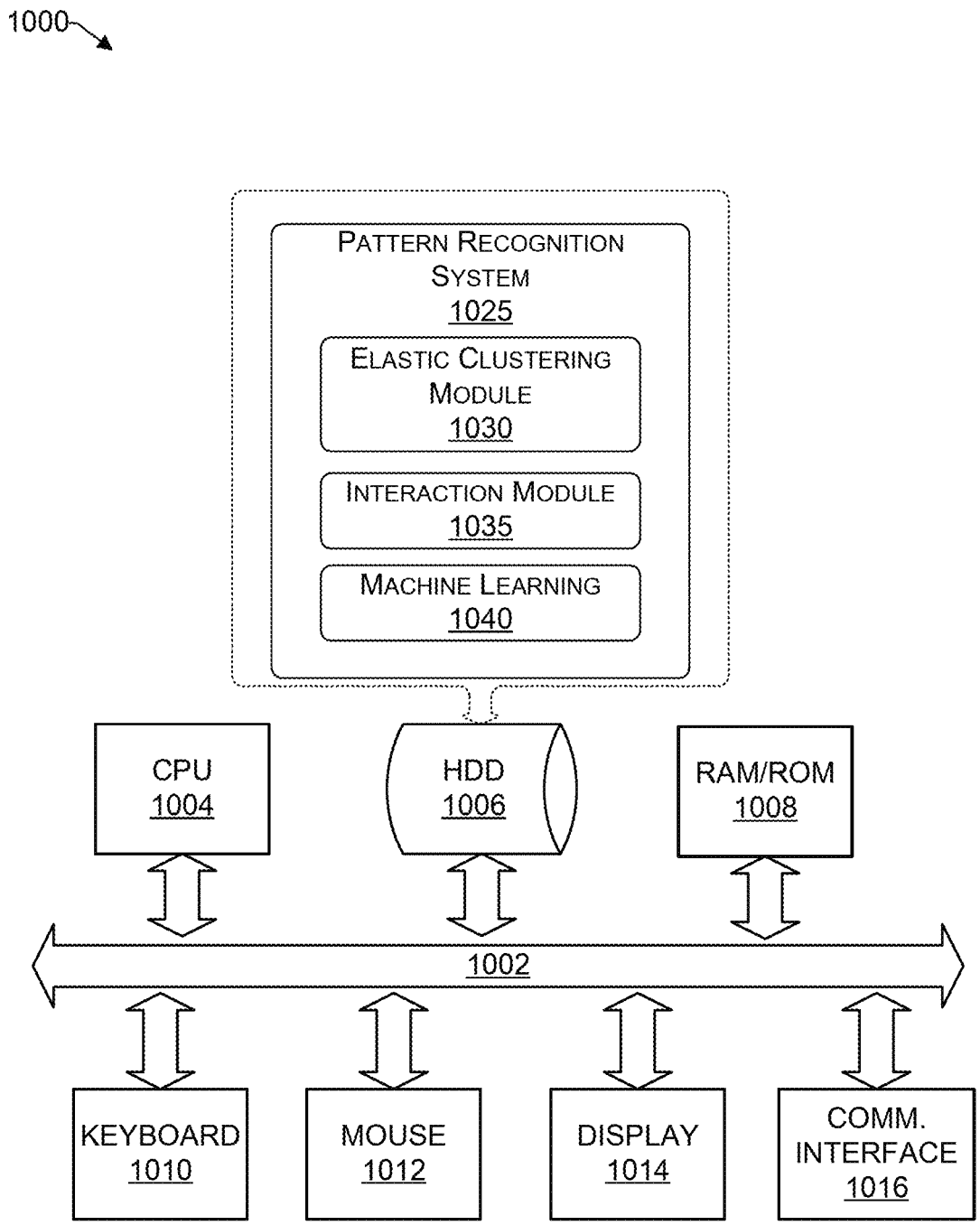
FIG. 10 is a functional block diagram illustration of a computer hardware platform that can be used to implement a computing device that is configured execute an elastic clustering algorithm, consistent with an illustrative embodiment.

FIG. 10 is a functional block diagram illustration of a computer hardware platform that can be used to implement a particularly configured computing device that operates with the example of the block diagram configured for operation of elastic clustering shown in FIG. 1A, consistent with an illustrative embodiment. In particular, FIG. 10 illustrates a network or host computer platform 1000, as may be used to implement an appropriately configured server.

The computer platform 1000 may include a central processing unit (CPU) 1004, a hard disk drive (HDD) 1006, random access memory (RAM) and/or read only memory (ROM) 1008, a keyboard 1010, a mouse 1012, a display 1014, and a communication interface 1016, which are connected to a system bus 1002.

In one embodiment, the HDD 1006, has capabilities that include storing a program that can execute various processes, such as the pattern recognition system 1025, which includes an elastic clustering module 1030 that executes the elastic clustering algorithm, in a manner described herein. Additional modules can be configured to perform different functions. For example, there may be an interaction module 1035 that is operative to receive electronic data from various sources, including static and video images for pattern recognition, as discussed herein.

In one embodiment, the elastic clustering module 1030 is operative to determine the content of each electronic communication. To that end, the elastic clustering module 1030 may use various techniques, such ST-STDP in combination with long term STDP, as discussed herein.

There may be a machine learning module 1040 operative to, during a training phase, learn from historical data to build one or more machine learning models that can be used to recognize patterns.

In one embodiment, a program, such as Apache™, can be stored for operating the system as a Web server. In one embodiment, the HDD 1006 can store an executing application that includes one or more library software modules, such as those for the Java™ Runtime Environment program for realizing a JVM (Java™ virtual machine).

Example Cloud Platform

As discussed above, functions relating to managing the compliance of one or more client domains, may include a cloud. It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
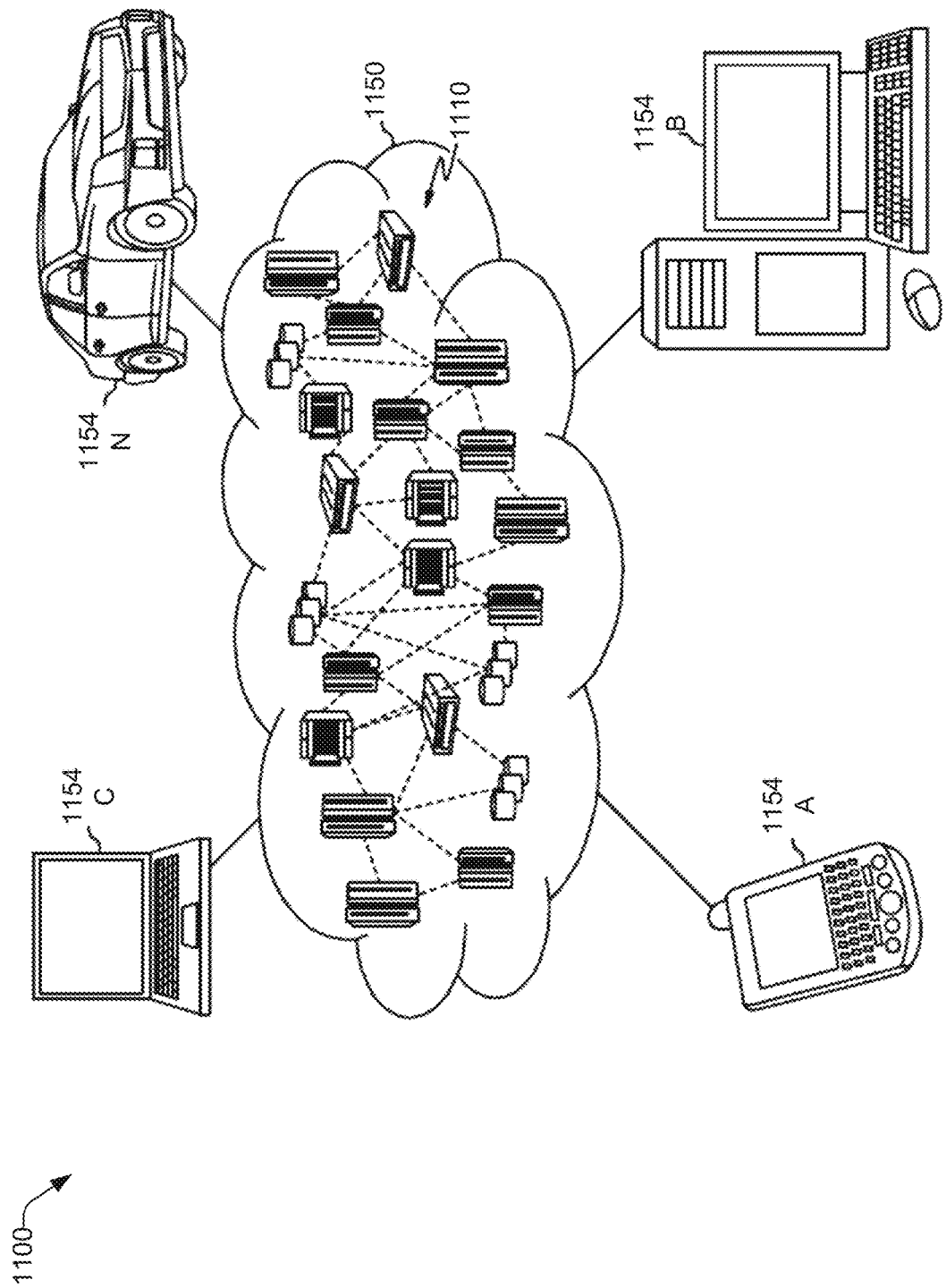
FIG. 11 depicts a cloud computing environment, consistent with an illustrative embodiment.

FIG. 11 depicts a cloud computing environment, consistent with an illustrative embodiment. Referring now to FIG. 11, an illustrative cloud computing environment 1100 is depicted. As shown, cloud computing environment 1100 includes one or more cloud computing nodes 1110 with which local computing devices used by cloud consumers, such as, for example, personal digital assistant (PDA) or cellular telephone 1114A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
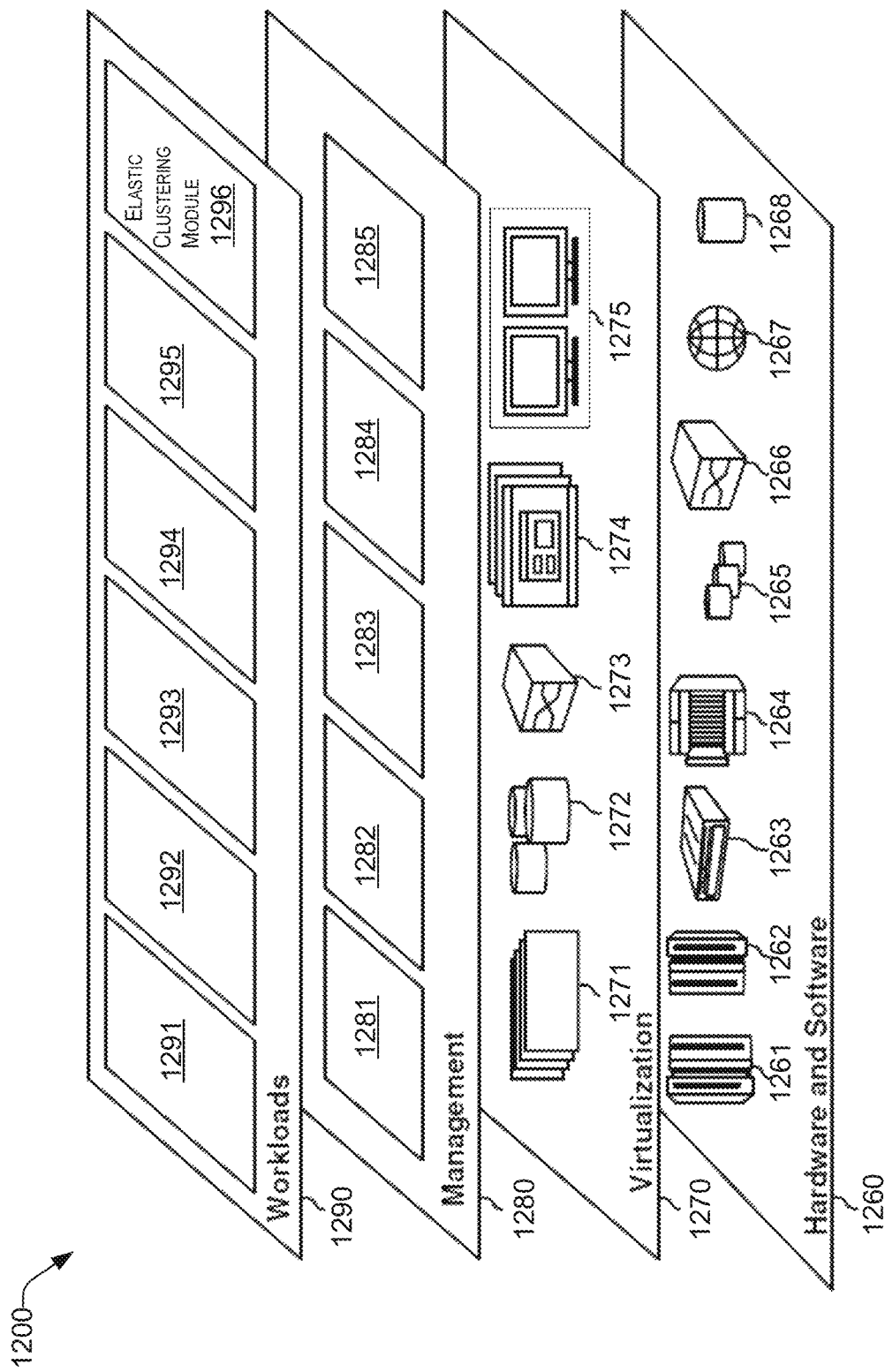
FIG. 12 depicts abstraction model layers, consistent with an illustrative embodiment.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and elastic clustering algorithm 1296 as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, a person of ordinary skill in the art should understand that the example shown in FIG. 1A is one of many ways the elastic clustering algorithm of the present disclosure can be practiced. It is to be understood that, for example, neural networks with any variation of ST-STDP can be simulated in software on hardware platforms such as CPUs, GPUs and AI accelerators with synaptic dynamics, and by simulated learning that updates programmable synapses on neuromorphic hardware.

In addition, the ST-STDP can be emulated in neuromorphic hardware with spike-timing dependent dynamics, for example, in analog CMOS or digital CMOS combined with short-term synaptic dynamics. In addition, hardware emulations may include Phase Change Memory (PCM), resistive memory, wherein a non-volatile memory element with volatile characteristics that match a form of short-term decay. Volatility can be used for the short-term component (f), non-volatility for the long term-term STDP weight storage (w). Further, hardware emulations of ST-STDP can be utilized in 3-terminal memristors. For example, the post-synaptic neuron output (including but not limited to the circuit shown in FIG. 1A) can be output to an STP control voltage circuit along with an input and STP parameters.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of pattern recognition using an elastic clustering algorithm for use in the recognition of occluded objects or of data from partial patterns, the method comprising:
    assigning one or more input datapoints of a sequence of datapoints representing a group of data to a particular cluster of K clusters, based on a distance from a centroid k representing a center of the particular cluster;
    in each of the K clusters:
        clustering the datapoints based on their location relative to the centroid k;
        shifting the centroid k from a first position to a second position determined to be closer than the first position to the sequence of input datapoints assigned to the particular cluster, over a predetermined time period, wherein the shifting is based on a distance between the sequence of input datapoints and the centroid k; and
        relaxing a location of the centroid k from the second position toward an equilibrium point of the particular cluster, wherein relaxing the location of the centroid k from the second position toward the equilibrium point of the particular cluster occurs according to an elasticity pull factor.

2. The computer-implemented method of claim 1, wherein the elasticity pull factor comprises dF/dt, in which F is a distance-dependent short-term component from the centroid k of the particular cluster at the time t.

3. The computer-implemented method of claim 2, wherein:
    a time constant of relaxation is set to match a time constant of input datapoints, and
    dF/dt is set to 1/R, where R is the rate of change of the input data points.

4. The computer-implemented method of claim 1, wherein the shifting of the centroid k from the first position to the second position is calculated utilizing an amplitude proportional to a proximity Pk(t) of the centroid k from respective positions of the sequence of input datapoints assigned to the particular cluster at the time t.

5. The computer-implemented method of claim 1, wherein a speed of the relaxing of the location of the centroid k from the second position to the equilibrium is determined by a size of dF/dt.

6. The computer-implemented method of claim 1, wherein the elastic clustering algorithm is implemented in a short-term spike-timing-dependent plasticity (ST-STDP) neural network.

7. The computer-implemented method of claim 1, further comprising a machine learning model that during a training phase is configured to:
    analyze a training set comprising sequences of data grouped over a time continuum; and label, by a subject matter expert (SME), each of the sequences, wherein the sequences of data includes dynamic data.

8. The computer-implemented method of claim 1, further comprising:
assigning a cluster assignment proximity P0(X,C) by calculating a proximity P0 of a spatiotemporal input X(0, . . . , t) to centroid traces Ci(0, . . . , t); and
updating the cluster by moving the centroid traces Ci by an update proximity metric P1.

9. The computer-implemented method of claim 8, wherein the proximity metric P1 is equal to the proximity metric P0 scaled by a measure of an intensity of the input.

10. The computer-implemented method of claim 8, wherein the cluster assignment proximity P0(X,C) comprises a Euclidean distance.

11. The computer-implemented method of claim 8, wherein the cluster assignment proximity P0(X,C) comprises an activation function of at least one of an integrated input or a leakage current.

12. The computer-implemented method of claim 8, wherein the cluster assignment proximity P0(X,C) comprises an integration recurrent input from centroids of the K clusters.

13. A non-transitory computer readable storage medium tangibly embodying a computer readable program code having computer readable instructions that, when executed, causes a computer device to carry out a method of performing pattern recognition of occluded objects or of data from partial patterns using an elastic clustering algorithm, the method comprising:
assigning one or more input datapoints of a sequence of datapoints representing a group of data to a particular cluster of K clusters based on a distance from a centroid k representing a center of the particular cluster;
clustering the datapoints based on their location relative to the centroid k;
shifting the centroid k in each of the K clusters from a first position to a second position determined to be closer than the first position from the sequence of input datapoints assigned to the particular cluster of the K clusters over a predetermined time period; and
relaxing a location of the centroid k in each of the K clusters from the second position toward an equilibrium point of the particular cluster of the K clusters.

14. The non-transitory computer readable storage medium of claim 13, wherein:
the elastic clustering algorithm is implemented in a short-term spike-timing-dependent plasticity (ST-STDP) neural network, and
the relaxing of the location of the centroid k from the second position toward the equilibrium point of the particular cluster of the K clusters occurs according to an elasticity pull dF/dt, wherein F is a distance-dependent short-term component from the centroid k of the particular cluster at a time t.

15. The non-transitory computer readable storage medium of claim 13, wherein a speed of the relaxing of the location of the centroid k from the second position to equilibrium is determined by a size of dF.

16. A computing device comprising:
a processor;
a storage device coupled to the processor;
a pattern recognition module using an elastic clustering algorithm stored in the storage device, wherein an execution of the pattern recognition module by the processor configures the computing system to recognize occluded objects or data from partial patterns comprising:
assign one or more input datapoints of a sequence of datapoints representing a group of data, to a particular cluster of K clusters based on a distance from a centroid k, representing a center of the particular cluster;
cluster the datapoints based on their location relative to the centroid k;
shift the centroid from a first position to a second position determined to be closer than the first position from the sequence of input datapoints assigned to the particular cluster of the K clusters over a predetermined time period; and
relax a location of the centroid from the second position toward an equilibrium point of the particular cluster of the K clusters, wherein the location of the centroid k is relaxed from the second position toward the equilibrium point of the particular cluster of the K clusters according to an elasticity pull factor based on a distance between the centroid k of the particular cluster at a time t.

17. The computing device according to claim 16, wherein the elasticity pull factor comprises dF/dt, in which F is a distance-dependent short-term component from the centroid k of the particular cluster at the time t.

18. The computing device according to claim 16, wherein the shift of the centroid k in each of the K clusters to the second position is calculated utilizing an amplitude proportional to a proximity Pk(t) of the centroid k from respective positions of the sequence of input datapoints assigned to the particular cluster at the time t.

19. The computing device according to claim 16, further comprising:
a circuit including an input node and an output node;
at least one pre-synaptic neuron coupled to the input node;
at least one post-synaptic neuron coupled to the output node;
a first synapse configured for controlling a short term component F(t) in conjunction with a learning function of a short term spike-timing-dependent plasticity (ST-STDP) module;
a second synapse configured to control a weight W(t) in conjunction with a learning function of a long-term standard plasticity (LT-STDP) module; and
an adder configured to receive the weight W(t) and the short-term component F(t) and output efficacies to the post-synaptic neuron.

20. The computing device according to claim 16, further comprising a machine learning model that during a training phase is configured to:
analyze a training set comprising sequences of data grouped over a time continuum; and
label, by a subject matter expert (SME), each of the sequences of data, wherein the sequences of data includes dynamic images.

* * * * *